United States Patent
Bang et al.

(10) Patent No.: US 6,219,232 B1
(45) Date of Patent: Apr. 17, 2001

(54) COMPUTER HAVING A DRIVE UNIT UNIFYING AN FDD AND A CD-ROM DRIVE

(75) Inventors: Il-Soon Bang, Kyungki-do; Byeong-Yong Song, Incheon-si, both of (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/268,670

(22) Filed: Mar. 16, 1999

(30) Foreign Application Priority Data

Mar. 18, 1998 (KR) .................................................. 98/9302

(51) Int. Cl.[7] ...................................................... H05K 7/02
(52) U.S. Cl. ...................... 361/685; 361/725; 312/223.2; 360/97.01
(58) Field of Search ...................................... 361/685, 725, 361/726; 360/97.01, 98.01, 137; 312/223.2

(56) References Cited

U.S. PATENT DOCUMENTS

| 5,495,390 | * | 2/1996 | Yu ........................................ 361/683 |
| 6,049,452 | * | 4/2000 | You et al. ........................... 361/685 |
| 6,062,663 | * | 5/2000 | You et al. ........................... 312/223.2 |

* cited by examiner

*Primary Examiner*—Leo P. Picard
*Assistant Examiner*—Hung Van Duong
(74) *Attorney, Agent, or Firm*—Robert E. Bushnell, Esq.

(57) ABSTRACT

A tower-shaped computer having a drive unit unifying an FDD (Floppy Disk Drive) and a CD-ROM drive (Compact Disk-Read Only Memory) horizontally on the lower part to improve the utility of the space effectively. There is provided a computer comprising a body having a receptacle in a lower part of a front face and a plurality of input-ports provided at a rear side of the receptacle; a drive unit being received in the receptacle such that a front portion thereof is protruded from the front face of the body, the drive unit includes a floppy disk drive integrated with a compact disk read-only memory drive and output ports positioned at a rear side thereof and connected to the input ports, respectively.

17 Claims, 9 Drawing Sheets

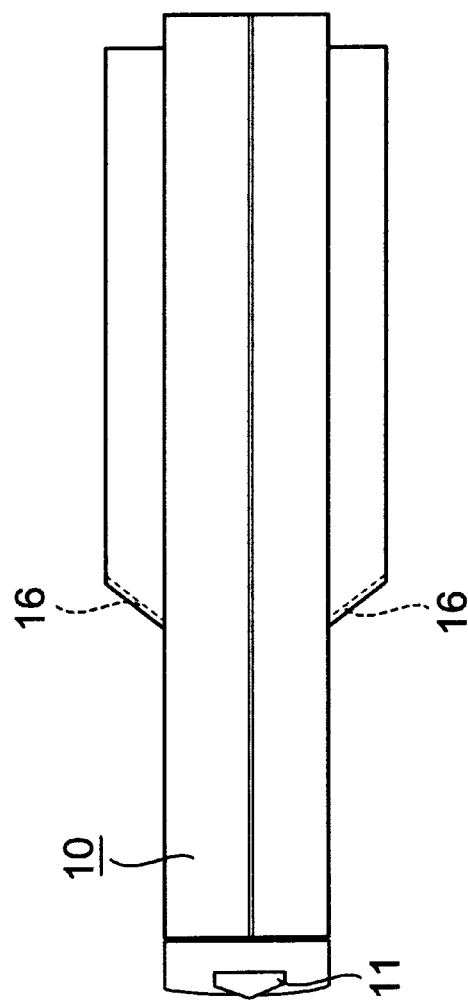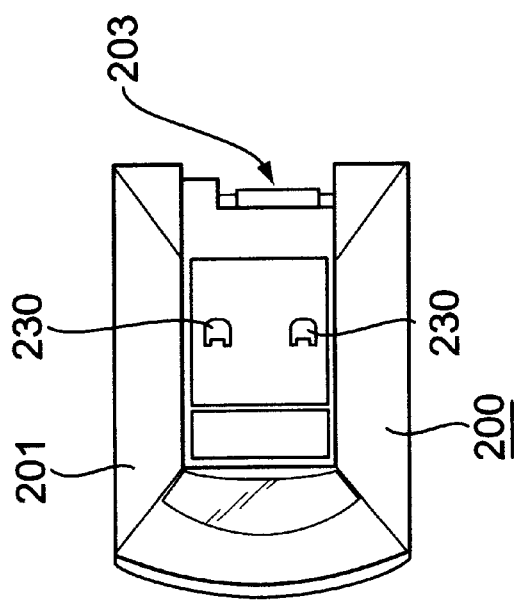
FIG. 7

COMPUTER HAVING A DRIVE UNIT UNIFYING AN FDD AND A CD-ROM DRIVE

CLAIM OF PRIORITY

This application makes reference to, incorporates the same herein, and claims all benefits accruing under 35 U.S.C. § 119 from my application entitled Computer Having Horizontal Unified Shape With FDD And CD-ROM filed with the Korean Industrial Property Office on Mar. 18, 1998 and there duly assigned Serial No. P98-09302 by that Office.

BACKGROUND OF THE INVENTION

1. Field of the Invention

The present invention relates to a computer, more particularly to a tower-shaped computer having a drive unit unifying an FDD (Floppy Disk Drive) and a CD-ROM (Compact Disk-Read Only Memory) drive horizontally.

2. Discussion of Related Art

In general, personal computers may be divided according to the shape of the computer case into the desktop-shaped computers constructed horizontally and the tower-shaped computers constructed vertically. On personal computers, a Floppy Disk Drive and a Compact Disk-Read Only Memory drive are typically mounted and used in a well known manner.

These FDD or CD-ROM drives are mounted on the computer only from a functional viewpoint with little regard for their design. However, the computer is nowadays little by little taken as an indispensable private instrument for business and information. Therefore, the computer must not only perform well but must generally be practical for users.

The computer has to be located as near to a user as possible in order to be used readily by the user. Computers are usually put on a desk or by the side of the desk. Here, when a computer needs a big space, the user must give up his space owing to the space occupied by the computer and this hinders the user's work. In order to avoid such an inconvenience, users prefer tower-shaped computer to desktop computers, because the tower-shaped computer occupies a smaller space than the desktop computer. Furthermore, of the tower-shaped computers, the compact computer, which is small in size and more efficient, is preferred by users. In addition, a computer with a unique design is preferred to a computer with a common appearance.

SUMMARY OF THE INVENTION

In order to overcome such drawbacks in the conventional art, it is therefore an object of the present invention to provide an improved tower-shaped computer.

It is a further object of the invention to provide a computer which offers improved utilization of space.

It is a still further object of the invention to provide a tower computer which has improved stability.

It is a yet further object of the invention to provide a computer with improved physical access to the floppy disk drive and CD-ROM drive.

It is a still yet further object of the invention to provide a computer whose structure allows for unique designs.

To achieve these objects and other advantages and in accordance with the purpose of the present invention, as embodied and broadly described, there is provided a computer comprising: a body having a receptacle in a lower part of a front face and a plurality of input-ports provided at a rear side of the receptacle; a drive unit being received in the receptacle such that a front portion thereof is protruded from the front face of the body, the drive unit includes a floppy disk drive integrated with a compact disk read-only memory drive and output ports positioned at a rear side thereof and connected to the input ports, respectively.

Herein, the compact disk read-only drive is located on a top surface of the drive unit and the top surface has a transparent window made of transparent materials. The drive unit has a pair of protrusions at a rear side of the transparent window and the protrusions are engaged with recesses formed on the top surface of the receptacle. A power switch made of transparent materials is provided on the upper part of the body and an on-and-off light is provided within the power switch.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein:

FIG. 7 is a plan view illustrating a separated state of the drive unit from the body according to the present invention;

DETAILED DESCRIPTION OF PREFERRED EMBODIMENT

Figure 1:
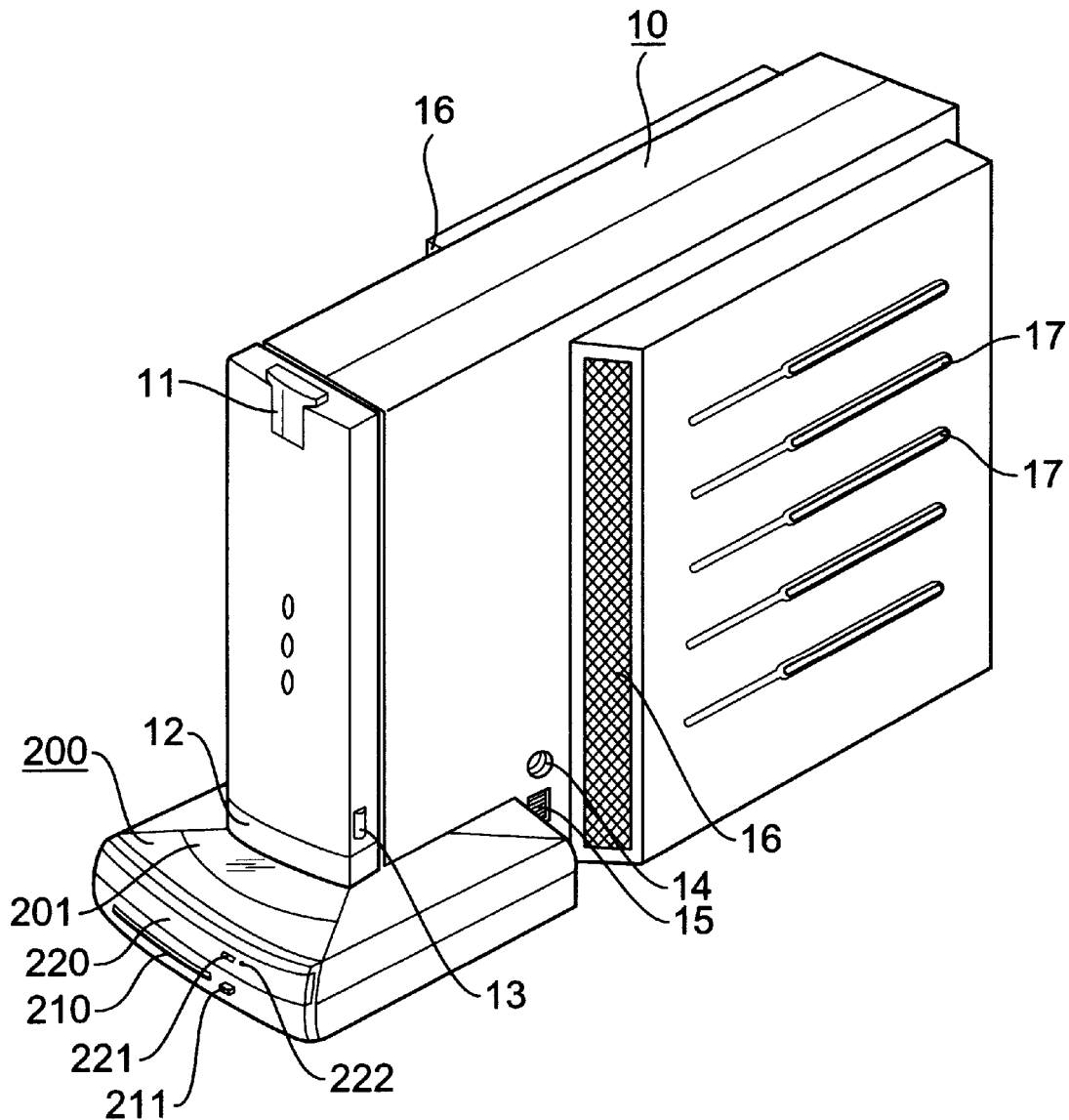
FIG. 1 is a perspective view of a computer according to the present invention.

The present invention will be apparent from the following description in detail in conjunction with the accompanying drawings. FIG. 1 is a perspective view of a tower-shaped computer according to the present invention and FIG. 2 is a perspective view illustrating a separated state of a drive unit from a computer body in the computer illustrated in FIG. 1.

Figure 2:
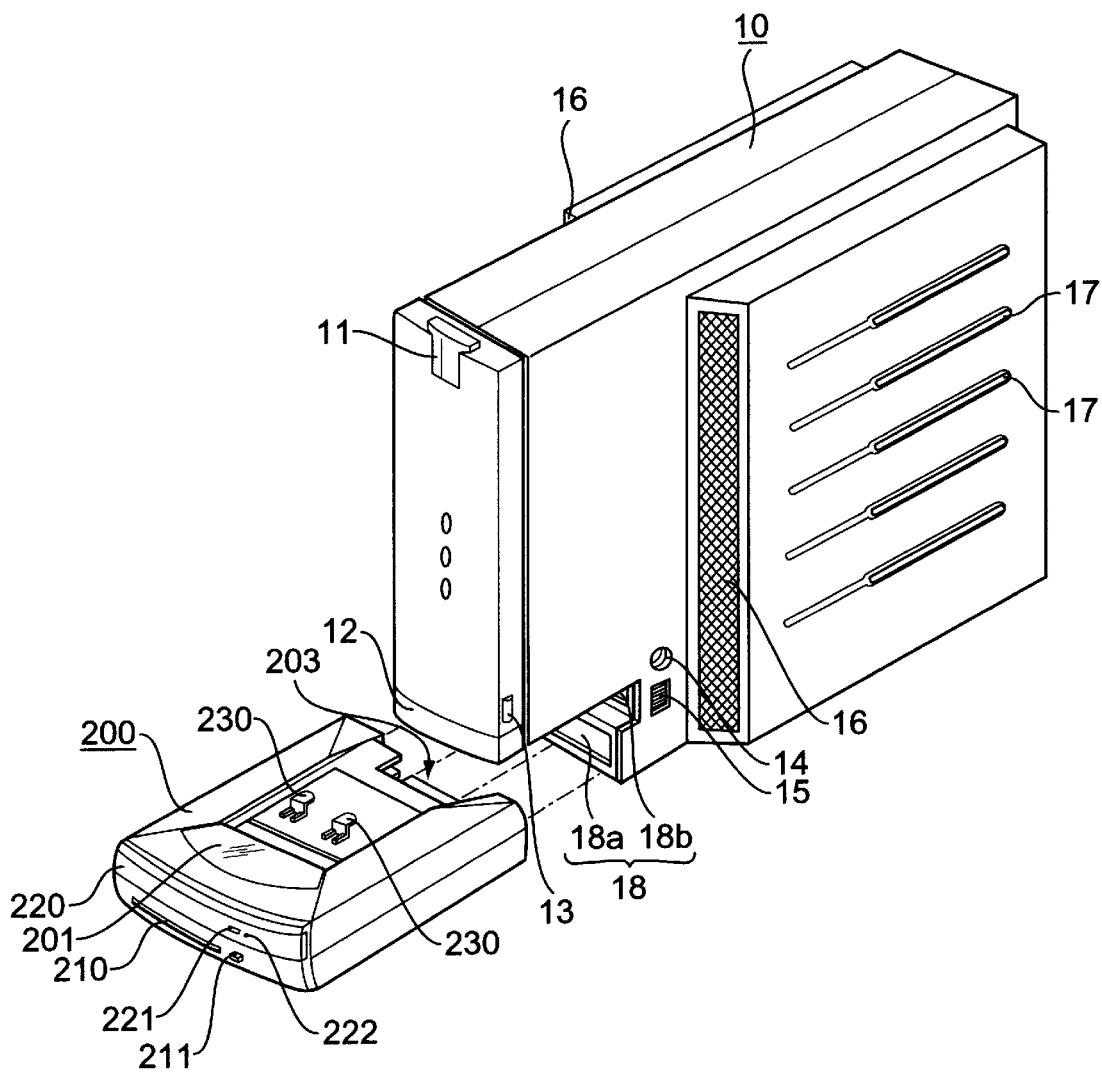
FIG. 2 is a perspective view illustrating separately a body of the computer and a drive unit.

Referring to FIG. 1 and FIG. 2, this invention is a tower-shaped computer having the body 10 in an upright position. There are provided various circuits inside of the body 10 as are well known in the art. There is provided a power switch 11 for supplying and cutting power to the computer in the upper part of the front face of the body 10. The power switch 11 is a pushbutton switch. In addition, the power switch 11 is made of semi-transparent material so that a light emitting diode provided in the inside can be seen from the outside. The switch is preferably made of colored transparent material, so that the power switch 11 is colored by the light emitting diode when the computer is turned on.

When the computer is turned on by the power switch 11, the light is emitted in color provided to the transparent material consisting of the power switch 11 and so a user is visually cued that the computer is on by the color. In addition, when the computer is in "standby" mode, the light emitting diode inside of the power switch 11 is flickered or pulsed so that a user can perceive a state of the computer more easily. Thus, being provided with the light emitting diode displaying a power state of the computer, the power switch 11 has a function of turning the computer on and off as well as of displaying a state of the computer with only the operation of the power switch 11.

A reset button 13 is located in a lower side of the body 10 and an input port of a microphone 14 as well as input-output ports of a USB (universal serial bus) 15 are placed in a rear side of the reset button 13. Further, a port for infrared ray communication 12 is located in the lower part of the front face of the body 10 and data can be transmitted and received by infrared ray communication with another computer using the port for the infrared ray communication 12. The techniques for transmitting and receiving data, using the port for the infrared ray communication, are well known and no explanation of these is necessary.

There are provided speaker grilles 16 in both sides of the body 10 and speakers are built in the inside of the respective speaker grilles. Further, the heat generated from the inside of the computer during the operation can be released through the speaker grilles.

The speaker grille 16 has many holes, and has a long vertical shape extending from the upper part of the body 10 to the lower part, allowing sound transmission and effective air circulation to release heat. There are provided a large number of decorative protrusions 17 extending in the horizontal direction in the side of the speaker grille 16. With these decorative protrusions 17, the computer can look better externally.

Referring to FIG. 2, a receptacle is formed in the lower part of the front face of the body 10 and a connector 18 is provided in the rear side of the receptacle. An input connector 18*a* for the floppy disk drive and an input connector 18*b* for connecting the compact disk-read only memory drive are provided in the connector 18. The receptacle is formed in the lower inside of the front face of the body 10.

As shown in FIG. 2, a drive unit 200 includes a floppy disk drive 210 being located in the lower part and a compact disk-read only memory drive 220 into one unit and the floppy disk drive 210 has an onboard button 211 for drawing out a floppy diskette as in a conventional floppy disk drive and the compact disk-read only memory drive 220 also has a button 221 for drawing out a tray on which a compact disk is loaded and an operating lamp 222 for displaying a driving state of the compact disk-read only memory drive 220. The structures of the floppy disk drive 210 and the compact disk-read only memory drive 220 are already well known and so the explanation thereof will be here unnecessary.

Figure 3:
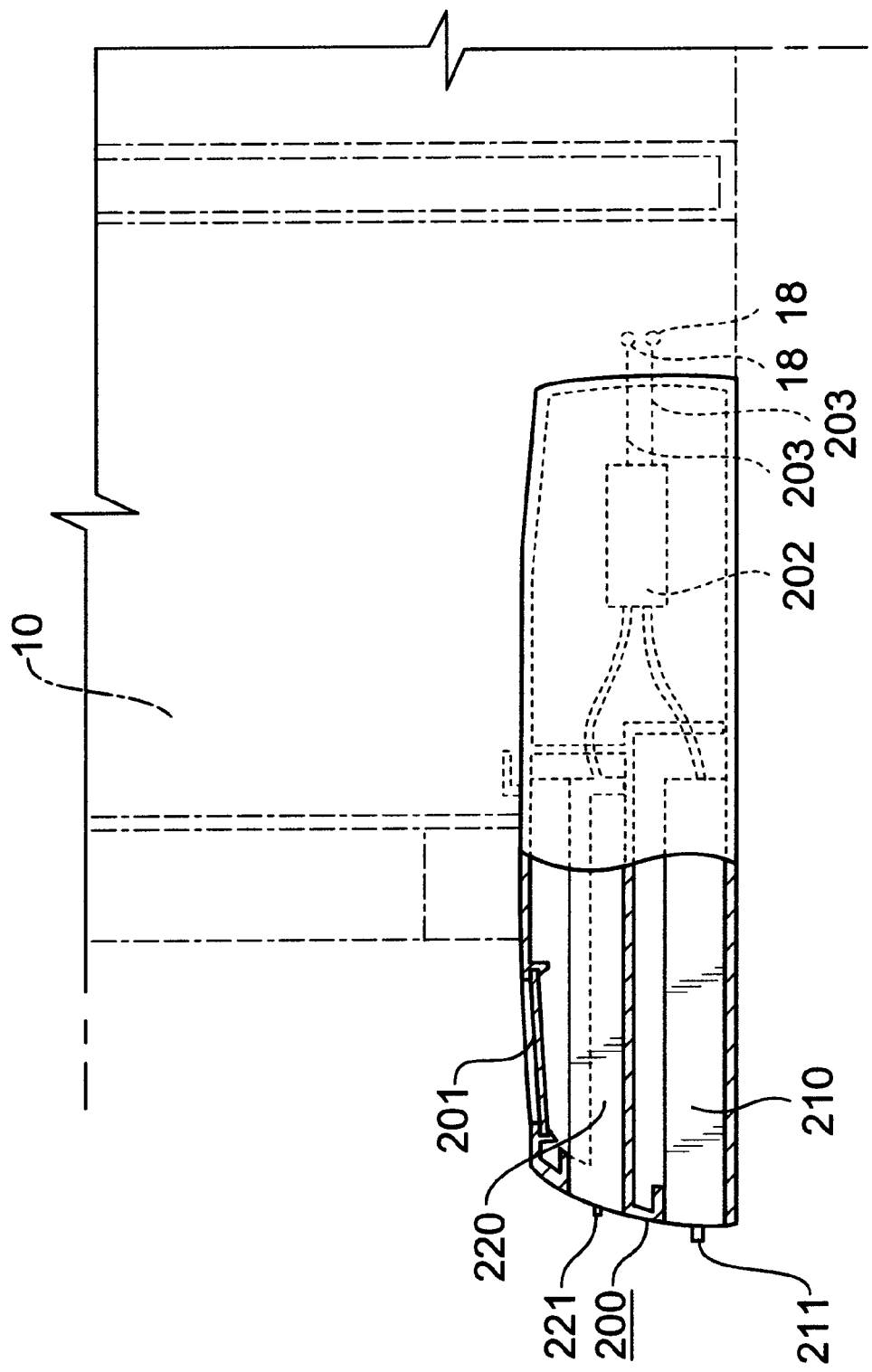
FIG. 3 is a partial sectional side view illustrating a structure of the drive unit according to the present invention.

FIG. 3 shows a structure of the drive unit 200 more particularly. As shown in FIG. 3, the drive unit 200 has the floppy disk drive 210 in the lower part and the compact disk-read only memory drive 220 on the upper part of the floppy disk drive 210. In addition, there is provided a transparent window 201 made of transparent material to make a user see the compact disk being operated in the compact disk-read only memory drive 220 on the upper part of the compact disk-read only memory drive 220.

Figure 4:
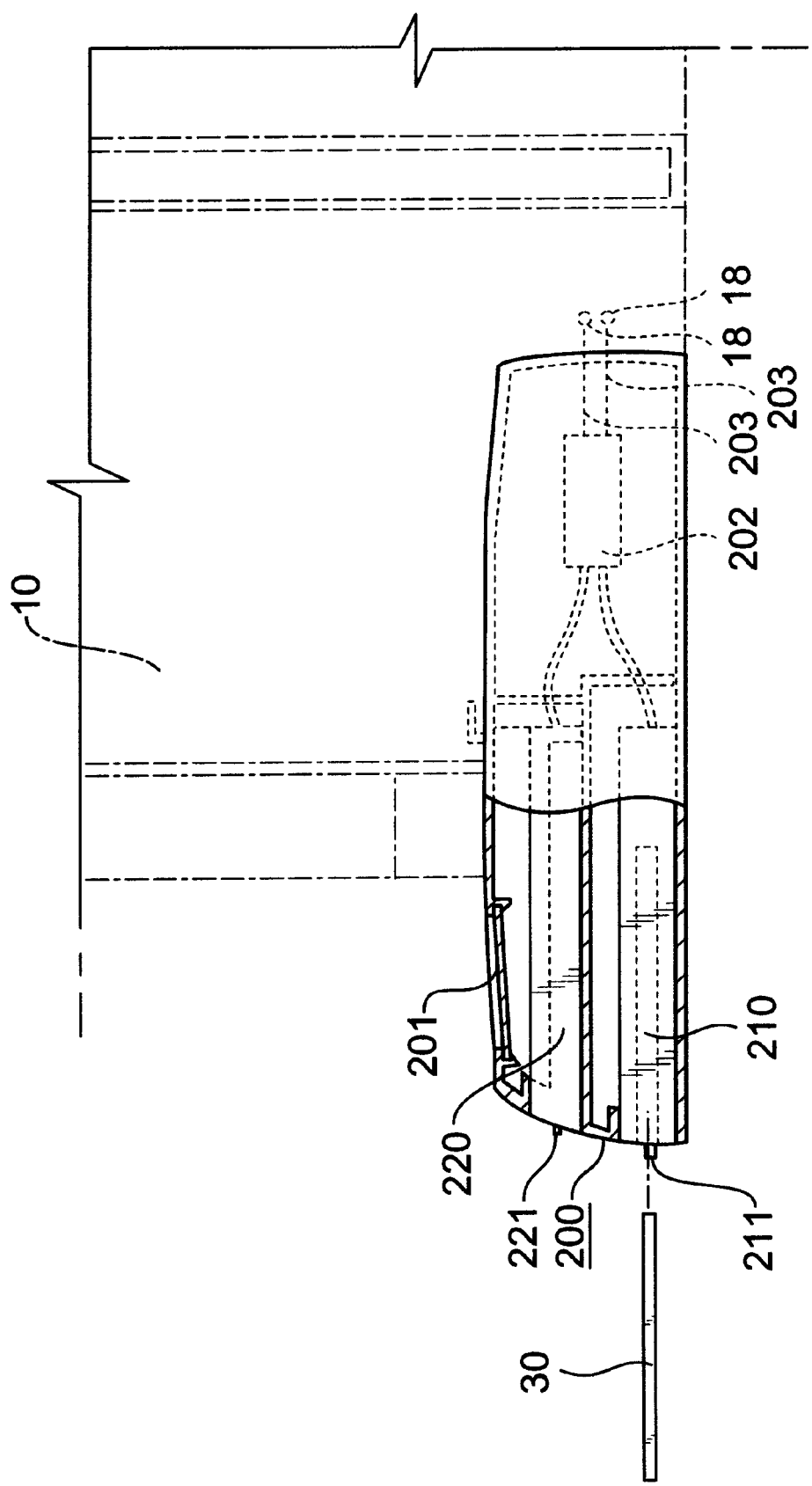
FIG. 4 is a partial sectional side view illustrating an operating state of a floppy disk drive of the drive unit according to the present invention.
Figure 5:
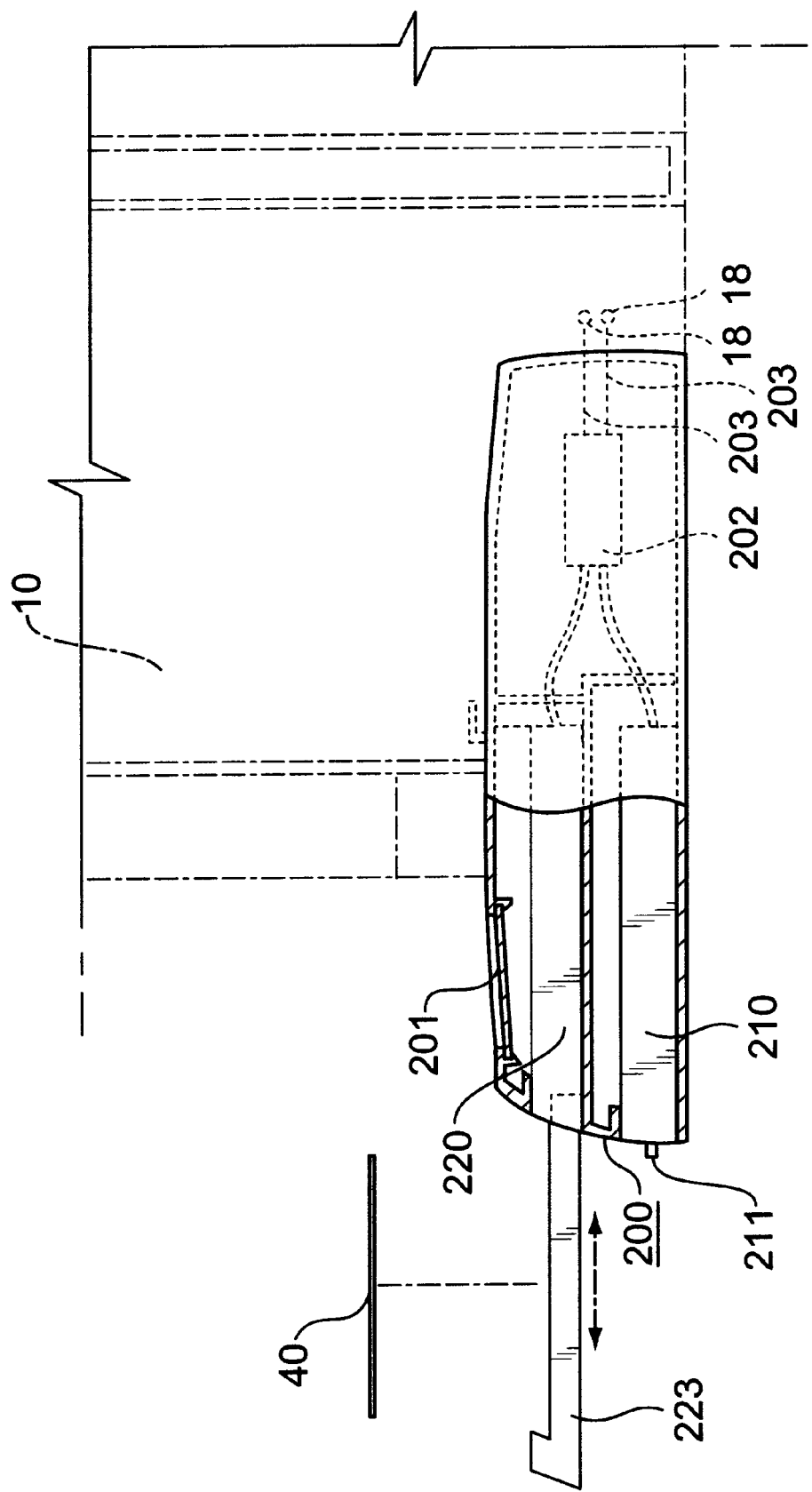
FIG. 5 is a partial sectional side view illustrating an operating state of a compact disk-read only memory drive of the drive unit according to the present invention.

FIG. 4 and FIG. 5 show the operation and way of usage of the drive unit 200. As shown in FIG. 4, the floppy disk drive 210, in the same way as the conventional floppy disk drive does, is driven to read data recorded in a floppy disk 30 or to store data on the floppy disk 30 when the floppy disk 30 is loaded in the floppy disk drive 210. When the floppy disk 30 needs to be drawn out from the floppy disk drive 210, a button for drawing out a disk has only to be pressed down, then the floppy disk 30 is automatically drawn out from the floppy disk drive 210.

In the compact disk-read only memory drive 220, as shown in FIG. 5, when the button for drawing out a disk 211 is pressed down, the tray 223 is drawn out. When the button for drawing out a disk 211 is pressed down or the tray 223 is pushed after a compact disk 40 has been loaded on the drawn tray 223, the compact disk 40 is loaded on the compact disk-read only memory drive 220.

Further, the floppy disk drive 210 and the compact disk-read only memory drive 220 are connected through a drive circuit 202 and an input connector 203 to a main circuit (not illustrated) provided in the inside of the body 10 and transmits or receives data from the floppy disk 30 and/or the compact disk 40 to the main circuit or in reverse.

Figure 6:
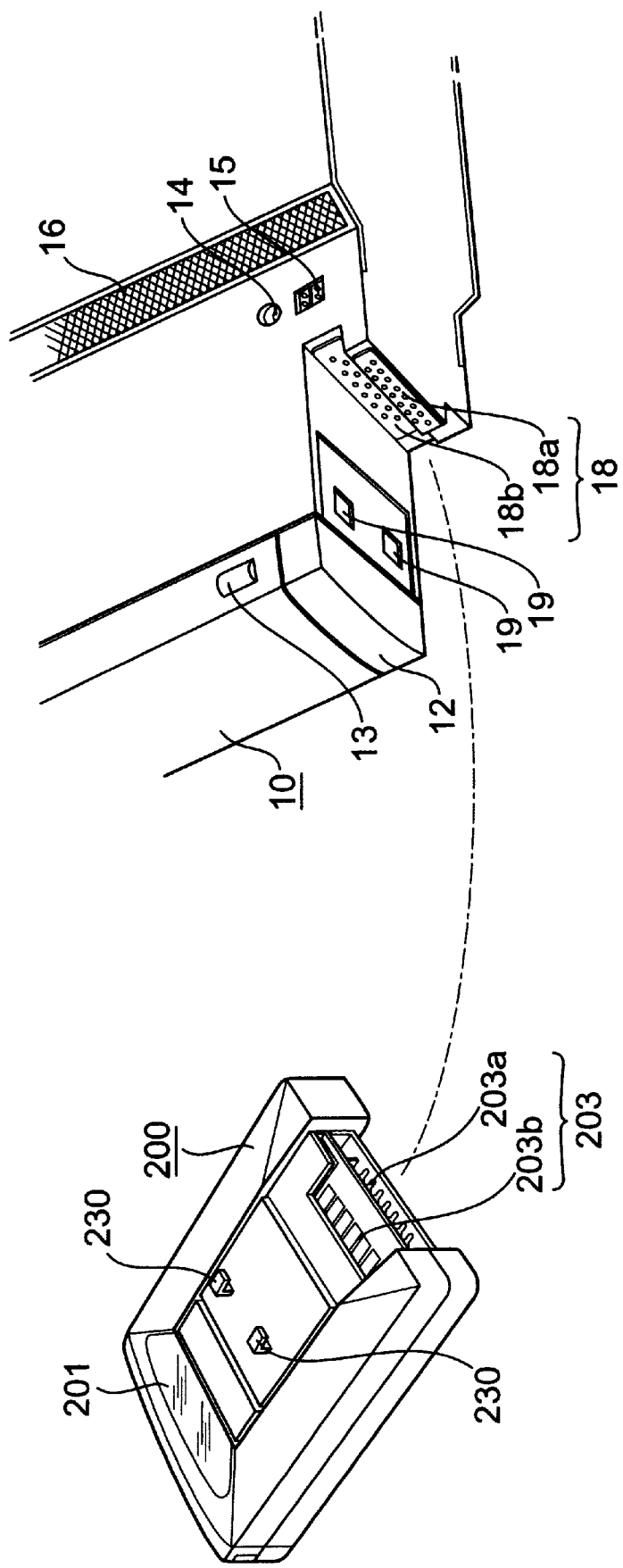
FIG. 6 is a perspective view illustrating a connector of a body and a drive unit and a connecting structure therebetween.

FIG. 6 illustrates a connecting relationship of the body 10 to the drive unit 200. As described above, the body 10 has the input connector 18 and the drive unit 200 has the output connector 203 capable of being connected to the input connector 18. Besides, the output connector 203 is able to be divided into an output connector for the floppy disk drive 203*a* and an output connector for the compact disk-read only memory drive 203*b*. Moreover, each of output connectors 203*a*, 203*b* is connected to each of input connectors 18*a*, 18*b* provided to the body 10.

Figure 8:
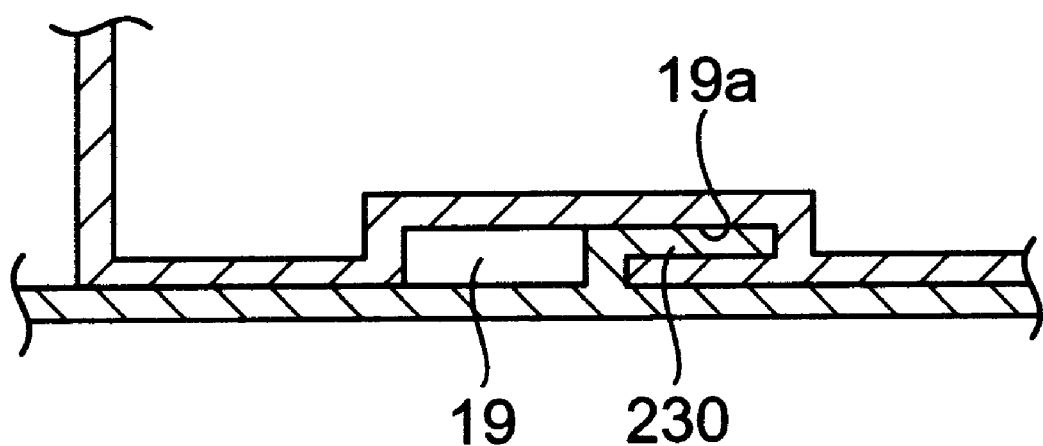
FIG. 8 is a grossly enlarged sectional view of a circumference of a line VIII–VIII' of FIG. 9 illustrating a connecting state of the drive unit with the body according to the present invention.

As shown in FIG. 6 and FIG. 7, there are provided a pair of connecting protrusions 230, on or from which the drive unit can be mounted or separated, on the upper part of the drive unit 200. As these connecting protrusions 230 are inserted into a pair of spaces 19 formed on the upper part of the receptacle and are engaged to projected pieces 19*a*, the drive unit 200 is set into the body 10, as shown in FIG. 8. Then, after the connecting protrusions 230 have been separated from the spaces 19, the body 10 is separated from the drive unit 200 by separating the connection of the connectors.

Figure 9:
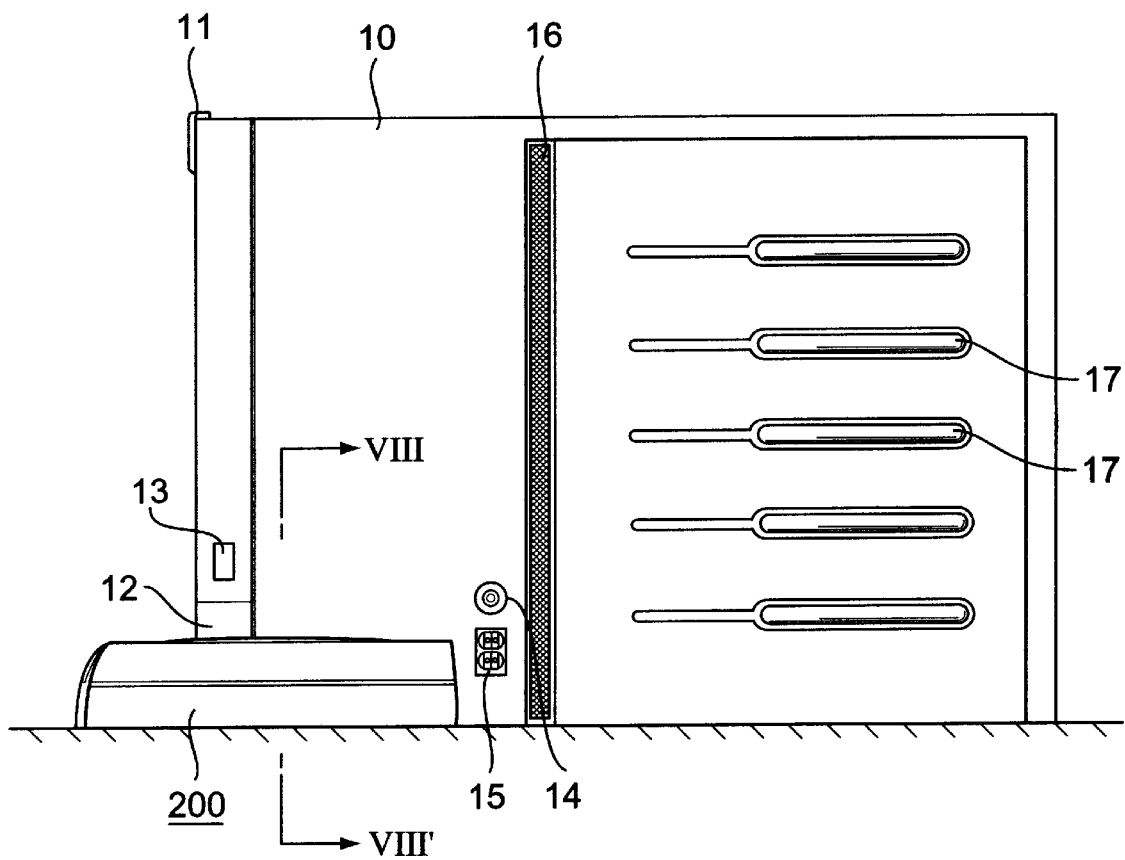
FIG. 9 is a side view illustrating a mounting state of the drive unit on the body according to the present invention.

FIG. 9 shows how the drive unit 200 is horizontally mounted on the lower part of the body 10. Referring to FIG. 9, the drive unit 200 adds to the stability of the computer, as the drive unit 200 is not only horizontally mounted but also set on the lower part of the body 10.

Moreover, as the drive unit 200 is mounted to be protruded forward from the body 10, the floppy disk drive 210 and the compact disk-read only memory drive 220 are located near the user. Consequently, a user can more easily reach and use the drives.

As explained above, the present invention integrates the floppy disk drive 210 and the compact disk-read only memory drive 220 into the drive unit and mounts it horizontally on the lower part of the computer in upright position to therefore increase stability and offer a unique design of the computer.

It will be apparent to those skilled in the art that various modifications can be made in the present invention, without departing from the spirit of the invention. Thus, it is intended that the present invention cover such modifications as well as variations thereof, within the scope of the appended claims and their equivalents.

What is claimed is:

1. A computer, comprising:

a body comprising:
   a front face; and
   a receptacle formed in the lower part of the front face, said receptacle having an input connector for a floppy disk drive and an input connector for a compact disk read-only memory drive;

a drive unit insertably installed in said receptacle of said body, said drive unit comprising:
   a compact disk read-only memory drive mounted horizontally;
   a floppy disk drive mounted horizontally; and
   output connectors for the compact disk read-only memory drive and floppy disk drive, said output connectors engaged with said input connectors.

2. The computer of claim 1, further comprising:

said body having spaces formed in the upper part of the receptacle; and

L-shaped connecting protrusions formed at the top of the drive unit, said connecting protrusions inserted into said spaces.

3. The computer of claim 1, said drive unit further comprising:

said floppy disk drive located in the lower part of the drive unit and said compact disk read-only memory drive located in the upper part of the drive unit.

4. The computer of claim 1, further comprising:

a power switch made of a transparent material, said power switch mounted on the upper part of said body.

5. The computer of claim 1, further comprising:

two speaker grilles, each having a vertical shape and each located on a side of the body, said speaker grilles extending from the upper part to the lower part of the body.

6. The computer of claim 1, further comprising:

an infrared communication port on the lower part of the front face of the body.

7. The computer of claim 1, further comprising:

said drive unit being wider than the front face of the computer.

8. The computer of claim 2, further comprising:

said receptacle further comprising projecting pieces projecting into said spaces for engaging said connecting protrusions.

9. The computer of claim 2, further comprising:

said drive unit being wider than the front face of the computer.

10. The computer of claim 3, said drive unit further comprising:

a transparent window in the upper part of the drive unit for allowing a user to view a compact disk in the compact disk read-only memory drive.

11. The computer of claim 4, further comprising:

an on/off light installed within the power switch for indicating the on/off status of the computer.

12. The computer of claim 4, further comprising: said drive unit being wider than the front face of the computer.

13. The computer of claim 5, said speaker grilles having holes for sound transmission and for ventilation of the computer.

14. The computer of claim 5, further comprising:

said drive unit being wider than the front face of the computer.

15. The computer of claim 11, further comprising:

said power switch being made of a colored transparent material, for di splaying the on/off light in color.

16. A computer, comprising:

a body comprising:
   a front face; and
   a receptacle formed in the lower part of the front face, said receptacle having an input connector for a floppy disk drive and an input connector for a compact disk read-only memory drive;

a drive unit insertably installed in said receptacle of said body, a portion of said drive unit protruding forward from said front face of said body of the computer, for providing easy user access to the drives, said drive unit comprising:
   a compact disk read-only memory drive mounted horizontally;
   a floppy disk drive mounted horizontally; and
   output connectors for the compact disk read-only memory drive and floppy disk drive, said output connectors engaged with said input connectors.

17. The computer of claim 16, further comprising:

said drive unit being wider than the front face of the computer.

* * * * *